Oct. 8, 1957 J. W. KEE 2,809,290

FUNCTION GENERATOR

Filed June 26, 1953 3 Sheets-Sheet 1

INVENTOR.
JOSEPH WARREN KEE
BY
Theodore C Jay Jr
AGENT

Oct. 8, 1957 J. W. KEE 2,809,290

FUNCTION GENERATOR

Filed June 26, 1953 3 Sheets-Sheet 2

INVENTOR.
JOSEPH WARREN KEE
BY
Theodore C Jay Jr
AGENT

Oct. 8, 1957 J. W. KEE 2,809,290

FUNCTION GENERATOR

Filed June 26, 1953 3 Sheets-Sheet 3

INVENTOR.
JOSEPH WARREN KEE
BY
Theodore C Jay Jr
AGENT

United States Patent Office 2,809,290

Patented Oct. 8, 1957

2,809,290

FUNCTION GENERATOR

Joseph Warren Kee, Monrovia, Calif., assignor to Vitro Corporation of America, Verona, N. J.

Application June 26, 1953, Serial No. 364,402

8 Claims. (Cl. 250—27)

My invention relates to analog computers and more particularly relates to function generators for use in such computers.

In the types of analog computers with which I am herein concerned various physical quantities such as shaft positions, angular displacements and the like are converted to electrical signals which are continuous functions of these quantities. It is often necessary to derive from these signals an output signal which represents a composite function of these signals. Devices called function generators are used for this purpose.

The prior art has knowledge of many types of function generators. Some of these will only respond to direct voltage signals; others make purposeful use of the non-linear properties of electrical components and associated circuitry; still others have intricate switching networks and perform sequentially various mathematical operations such as logical multiplication, addition, subtraction, multiplication and division in accordance with the type of incoming signals supplied.

I have invented a function generator, which in contradistinction to such known devices, will derive from a plurality of incoming alternating signals, an output signal which represents a composite function of these quantities without the purposeful use of non-linear elements and without the use of switching networks and associated circuitry.

Accordingly, it is an object of the present invention to provide a novel function generator of the character indicated.

Another object of the present invention is to provide a function generator which will derive from incoming alternating signals an output signal which is capable of representing a wide range of composite functions of these signals.

Still another object is to provide a function generator which will perform the dual mathematical operation of addition and division upon incoming alternating signals which represent algebraic quantities.

It is a further object to provide a function generator element, which when used in conjunction with other like elements can be formed into a composite function generator.

Yet a further object is to provide a function generator element which can be connected to other like generators to form a composite function generator.

These and other objects of the invention will be explained or become apparent to one skilled in the art when this specification is read in conjunction with the accompanying drawings wherein.

Figure 4A:
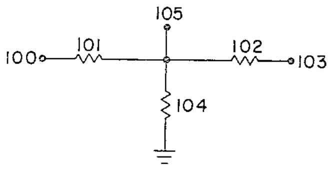
Figure 4B:
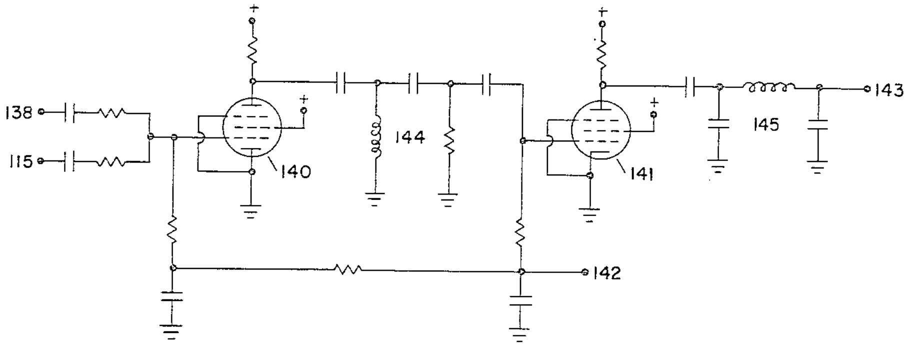
Figure 4C:
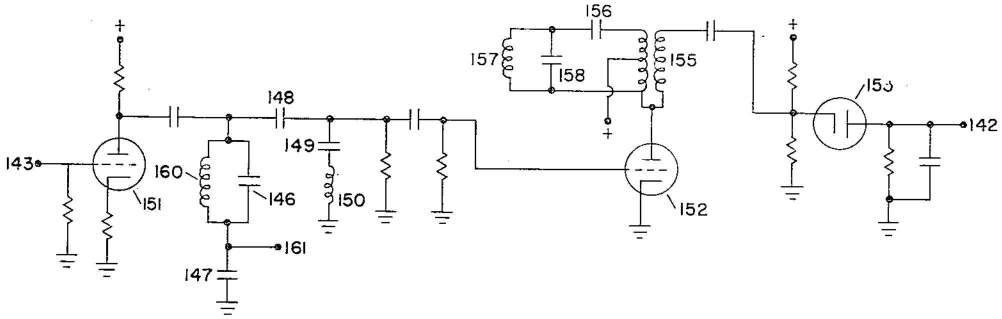
Figure 4D:
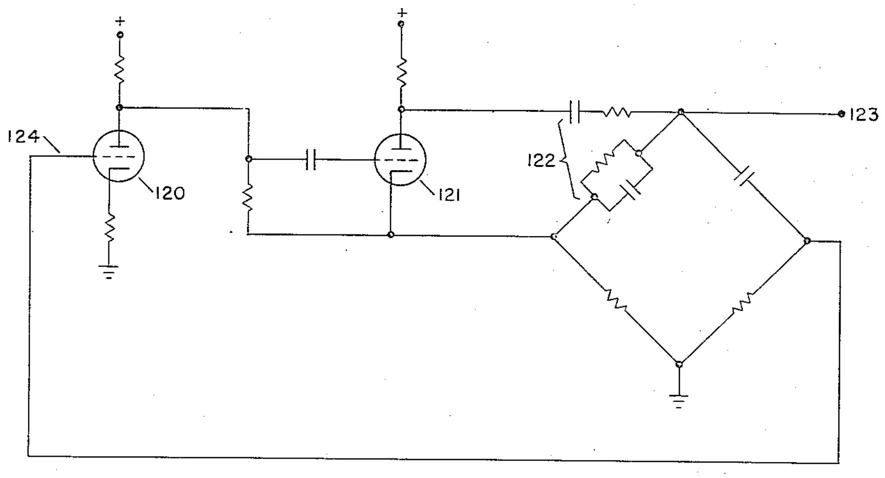

Figure 4*a* shows schematically a typical mixer;

Figure 4*b* shows schematically a typical amplifier;

Figure 4*c* shows schematically a typical filter and detector;

Figure 4*d* shows schematically a typical oscillator, and

Figure 4E:
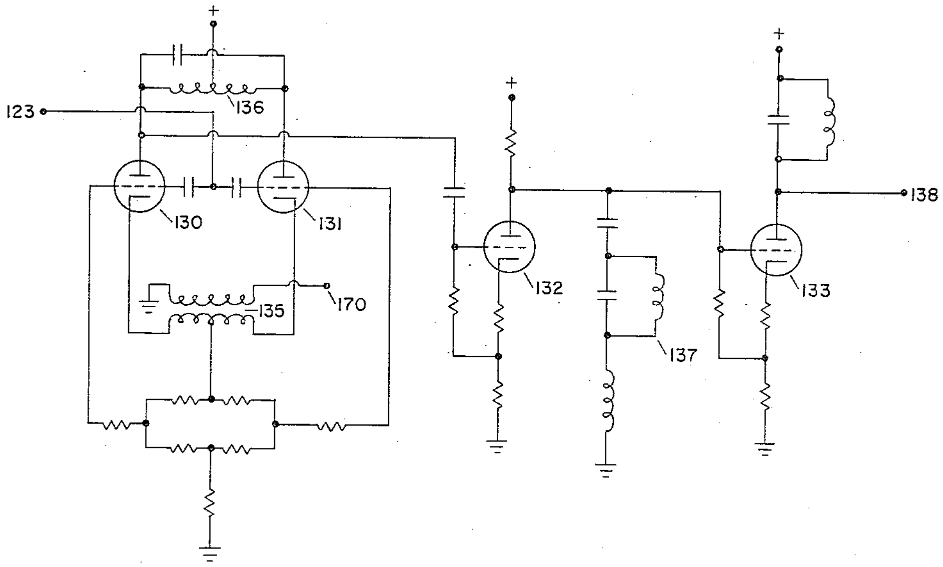

Figure 4*e* shows schematically a typical modulator.

Briefly stated, my invention contemplates as a function generator element an amplifier having a predetermined bandwidth and a filter network having first and second output circuits. Each output circuit is tuned to a different frequency falling within this bandwidth. The input of the network is coupled to the output of the amplifier. When first and second incoming electrical signals subject to amplitude variations and having frequencies which correspond to the frequencies of the first and second output circuits respectively are applied to the input of the amplifier, first and second output signals whose frequencies respectively correspond to the tuned frequency of the first and second output circuits appear across these corresponding output circuits.

In addition, I provide means, which may include a detector, for deriving from the first output signal an automatic gain control voltage and means to supply this voltage to the input of the amplifier to control the gain thereof. Through action of this control voltage, the amplitude of the second output signal varies directly with the amplitude of the second incoming signal and inversely with the amplitude of the first incoming signal.

The two incoming signals may themselves be predetermined functions of other signals. I therefore provide apparatus for combining these other signals, and couple the outputs of these apparatus to the input of the bandpass amplifier. In a preferred embodiment, these apparatus are adders so that the first and second incoming signals each represent the sum or difference of quantities represented by two other signals in accordance with the algebraic signs of these quantities. In this situation, the second output signal varies directly with one sum or difference quantity and inversely with the other sum or difference quantity.

In another embodiment, the incoming signals applied to the amplifier have the same frequency and I therefore provide heterodyning apparatus to change the frequency of one of these incoming signals.

I also provide means for connecting various like function generator elements together to form a composite function generator for generating a function having factorial components, each component being generated by one of the said elements.

Figure 1:
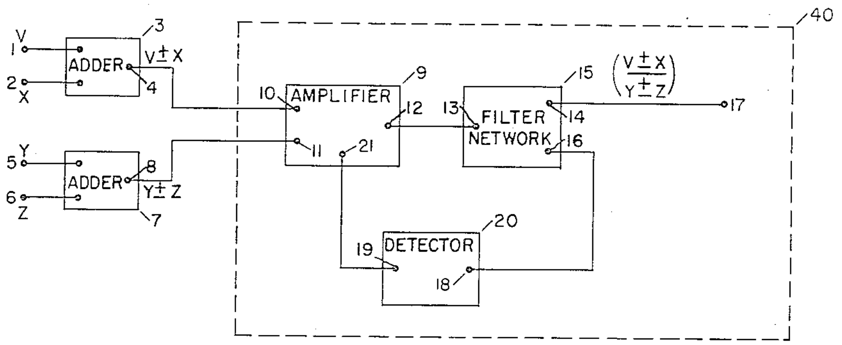
Figure 1 shows in block form a function generator element which responds to two sets of incoming signals, each set having a different frequency.

Referring now to Figure 1, a first incoming alternating signal subject to amplitude variation is supplied to an input 1 of combining apparatus 3. The amplitude of the first signal is proportional to a quantity V. A second incoming alternating signal subject to amplitude variation is supplied to another input 2 of apparatus 3. The amplitude of the second signal is proportional to a quantity X. In this example, apparatus 3 is an additive circuit. The first and second signals have the same frequency and either have the same phase or are opposed in phase. In the former case the output signal of apparatus 3 appearing at output 4 represents $(V+X)$; in the latter case the output signal represents $(V-X)$.

In like manner, third and fourth signals representing quantities Y and Z respectively are supplied to inputs 5 and 6 of additive circuit 7. The output signal of apparatus 7 then represents $(Y\pm Z)$. The frequency of the third and fourth signals and the output signal of circuit 7 differs from the frequency of the first and second signals and the output signal of circuit 3.

The output signals from adders 3 and 7 are respectively applied to inputs 10 and 11 of amplifier 9. Amplifier 9 has bandpass characteristics so chosen that both adder output signals are amplified to the same degree and appear as a common amplified signal at the output 12 of amplifier 9.

This amplified signal is supplied to the input 13 of a filter network 15. This filter separates the amplified signal into its original frequency components, the signal component having the frequency of the adder 3 output signal appearing at filter output 14, while the signals component having the frequency of the adder 7 output signal appears at filter output 16.

The signal component appearing at filter output 14 is conducted to the system output terminal 17.

The signal component appearing at filter output 16 is supplied to the input 18 of a detector 20. This component is detected to derive a negative automatic gain control voltage therefrom which appears at the output 19 of detector 20 and is supplied to an input 21 of amplifier 9 to control the gain thereof in a manner in which the amplitude of the signal component appearing at output terminal 17 varies directly with the amplitude of the output signal from adder 3 and inversely with the amplitude of the output signal from adder 7. Consequently, the signal component appearing at output terminal 17 represents the quantity $$\left(\frac{V \pm X}{Y \pm Z}\right)$$

In the special case where one or more of the incoming signals is not present, the appropriate adder stage may be eliminated. For example, if signal X is not present, signal V may be fed directly to the input 10 of amplifier 9 and adder 3 can be removed from the circuit.

Figure 2:
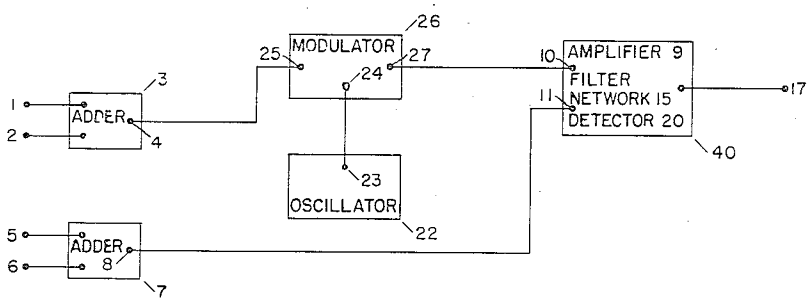
Figure 2 shows in block form a function generator element which responds to two sets of incoming signals, each set having the same frequency.

In the event that all four of the incoming signals applied to the inputs of the additive circuits have the same frequency, it is necessary to shift the frequency of the output signal yielded by one of the adders so that the adder output signals will have different frequencies. Apparatus for shifting this frequency is shown in Figure 2.

In this example, the frequency of the output signal from adder 3 is shifted relative to that of the output signal from mixer 7 by heterodyning means which may include an oscillator 22 and a modulator 26. The output signal from the oscillator which is of fixed frequency and amplitude is supplied to an input 24 of modulator 26. The output signal from adder 3 is supplied to an input 25 of modulator 26. There two signals are heterodyned together to yield at 27 a modulator output signal whose amplitude variations are directly proportional to the variations of the output signal from adder 3 and whose frequency represents the sum or difference frequency between the two signals supplied to the inputs of the modulator.

The modulator output signal is then supplied to the amplifier input as before. For ease of further discussion, the combination of amplifier 9, filter 15 and detector 20 is identified generally at 40.

Thus far, I have described a function generator element which can generate functions of the form $$\frac{(V \pm X)}{(Y \pm Z)}$$

Figure 3:
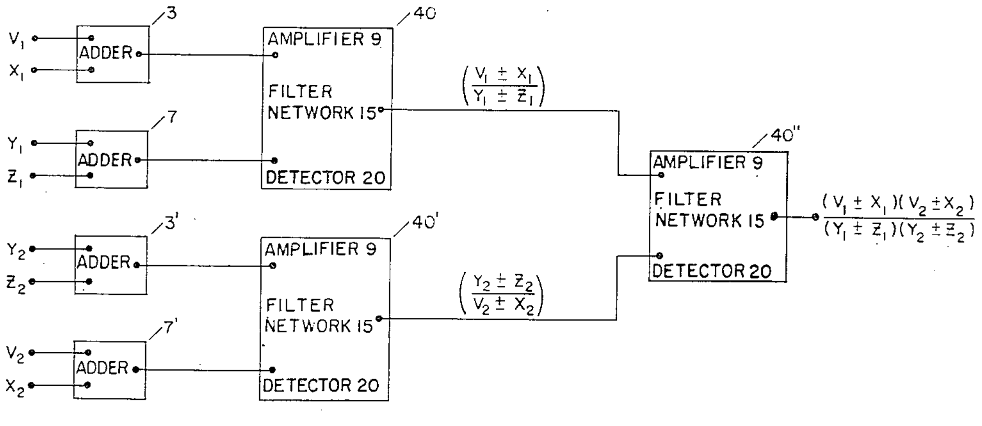
Figure 3 shows in block form a function generator formed from a plurality of function generator elements.

By using a plurality of these elements in the manner shown in Figure 3, it is possible to generate functions of the form $$\frac{(V_1 \pm X_1)(V_2 \pm X_2)\ \ldots\ (V_n \pm X_n)}{(Y_1 \pm Z_1)(Y_2 \pm Z_2)\ \ldots\ (Y_n \pm Z_n)}$$

Input signals $V_1$, $X_1$, $Y_1$ and $Z_1$ are fed through additive circuits 3 and 7 and the combination 40 to produce an output signal having the form $$\frac{V_1 \pm X_1}{Y_1 \pm Z_1}$$

In like manner input signals $Y_2$, $Z_2$, $V_2$ and $X_2$ are fed through adders 3' and 7' and the combination 40' to produce an output signal having the form $$\left(\frac{Y_2 \pm Z_2}{V_2 \pm X_2}\right)$$

Both output signals are fed through the combination 40'' to produce an output signal having the form $$\left(\frac{V_1 \pm X_1}{Y_1 \pm Z_1}\right)\left(\frac{V_2 \pm X_2}{Y_2 \pm Z_2}\right)$$

It will thus be apparent that by connecting additional generator elements in the same manner as described above, it is possible to generate functions of the type described above which have any number of factors.

Figure 4*a* shows schematically one type of additive circuit which may be used in the apparatus shown in the preceding Figures 1, 2 and 3. The adder includes first and second input terminals 100 and 103, output terminal 105. Resistors 101 and 102 are respectively connected between input terminals 100 and 103 and output terminal 105. Output terminal 105 is connected through resistor 104 to ground. These resistors can have any desired resistance value. If first and second incoming signals subject to amplitude variation and having the same frequency and phase are respectively applied between the corresponding input terminals, and ground, an output signal which represents the amplitude summation of the incoming signals appearing between output terminal 105 and ground.

If necessary the value of resistor 104 may be made small with respect to the other resistor values, in order to minimize the effect of crosstalk between the incoming signals. Should the incoming signals be opposed in phase, the output signal will represent the amplitude difference of the incoming signals.

Figure 4*b* shows schematically the amplifier 9 shown in block form in Figure 1. First and second adder output signals having different frequencies and subject to amplitude variations are supplied to corresponding amplifier inputs 138 and 115. The frequency of the first signal may be, for example, 400 cycles per second and the frequency of the second signal may be 650 cycles per second. In this example, the amplifier is a conventional two-stage amplifier having bandpass characteristics at which all frequencies slightly above 650 and slightly below 400 cycles are substantially cut off and all frequencies within 400–650 cycle band are amplified with substantially constant gain.

Valve 140 and its associated output network identified generally at 144 constitute a high pass amplifier stage set to cut off below 400 cycles. Valve 141 and its associated output network indicated generally at 145 constitute a low pass amplifier stage set for cut off above 650 cycles. The 650 cycle voltage appearing at 115 is fed to the control grid of valve 140 as is the 400 cycle signal appearing at 138. Therefore amplified 400 and 650 cycle signals appear at output terminal 143. The automatic gain control voltage previously referred to is applied at terminal 142 and is supplied through various resistors to the control grids of the valves 140 and 141 respectively. Through the action of this control voltage, the overall gain of the amplifier varies inversely with the amplitude variations of the 650 cycle voltage.

Figure 4*c* shows schematically the filter network and detector 15 shown in block form in Figure 1. The signals produced at the amplifier output terminal 143 are amplified in valve 151. Impedances 160, 146 and 147 across the anode circuit of valve 151 constitutes the low-pass filter of a complementary filter set which passes the 400 cycle component and substantially rejects the 650 cycle component. Consequently, the 400 cycle output signal appears at output terminal 161.

Impedances 148, 149 and 150 constitute the high pass filter of the filter set which passes the 650 cycle component and which substantially rejects the 400 cycle component.

The 400 cycle component, after leaving the high pass filter, is supplied to valve 152 and is amplified therein. A transformer 155 is included in the anode circuit of valve 152. The circuit connected to the primary of this transformer includes impedances 157, 158 and 156 arranged to accentuate the 650 cycle component and to attenuate still further any 400 cycle component which may have passed through the high pass filter. The secondary of the transformer 155 is coupled to a diode 153. This diode is so sensed and biased that it derives from the negative peaks of the 650 cycle component a negative automatic gain voltage which is produced at terminal 142 and thereafter fed back to the amplifier in the manner described above.

Figure 4d shows schematically the oscillator 22 shown in block form in Figure 2. It is a conventional Wien-bridge type oscillator which produces an output voltage of fixed amplitude and fixed frequency; for example, 1050 cycles per second. It includes valves 120 and 121. The regenerative feed back coupling between the output 123 and the input 124 of the oscillator is provided through part of the Wien-bridge at 122.

This bridge, being a frequency selective network, allows only a voltage of 1050 cycles per second to be effective in the circuit because of the voltage phase shift and degeneration provided by this network at all other frequencies. Consequently the oscillator yields the desired output voltage at 123.

Figure 4e shows schematically the modulator 26 shown in block form in Figure 2. The purpose of the modulator is to heterodyne the oscillator voltage with an output signal from a mixer to produce a heterodyned signal whose amplitude varies in accordance with the amplitude of the mixer output signal and whose frequency represents the difference between the oscillator frequency and the frequency of the mixer output signal. In this example, the oscillator frequency is 1050 cycles per second and the mixer output signal frequency is 400 cycles per second.

Valves 130 and 131 are connected in a balanced modulator circuit. The oscillator voltage is supplied from terminal 123 through corresponding capacitors to the grids of valves 130 and 131, thus driving these grids in parallel. The mixer signal is supplied through terminal 170 to the primary winding of a transformer 135. The resulting voltage developed across the secondary winding (which is center tapped to ground) is supplied in push-pull to the cathodes of valves 130 and 131. Therefore, a difference frequency voltage of 650 cycles per second is developed across output circuit 136. This circuit is tuned to 650 cycles to help discriminate against unwanted frequencies. The difference frequency is then fed to the control grid of valve 132. The anode circuit of this valve is shunted by an impedance load which varies with frequency and is indicated generally at 137.

Because of the resistance in the cathode circuit of tube 132, a highly degenerative feed back loop is established for this tube. The frequency variation of the impedance load is such that the load provides a null for the 400 cycle and 1050 cycle components of the modulator output signal and in addition provides a peak for the 650 cycle signal. A signal appearing at the anode of valve 132 is fed to the control grid of valve 133. Valve 133 has the same degenerative feed back loop as valve 132. A tank circuit tuned to 650 cycles is included in the anode circuit of valve 132.

Effectively therefore, valves 132 and 133 form a filtering arrangement whereby a 650 cycle signal whose amplitude variations are proportional to the amplitude variations of the signal applied at terminal 170 is produced at the output 138 of valve 133.

While I have shown and described and pointed out the fundamental novel features of the invention as applied to preferred embodiments, it will be understood that various omissions, substitutions and changes in the form and details of these embodiments may be made by those skilled in the art without departing from the spirit of the invention. It is my intention therefore to be limited only as indicated by the scope of the claims that follow.

I claim:

1. A function generator element responsive to first and second incoming signals of like frequency each of which is subject to amplitude variation, said element comprising heterodyning means responsive to said first signal to derive therefrom a third signal whose amplitude variations are proportional to the variations of said first signal and whose frequency differs from that of said first signal; amplifying means coupled to said heterodyning means and responsive to said first and third signals to amplify these signals with substantially the same gain; frequency separation means coupled to said amplifying means and responsive to said amplified signals to yield a first output signal whose frequency equals that of said incoming signals and a second output signal whose frequency equals that of said third signal; means coupled to said separation means and responsive to one of said output signals to derive an automatic gain control voltage therefrom; and means coupled between said gain control means and said amplifying means to apply said control voltage to said amplifying means to control the gain thereof to an extent at which the amplitude of the other output signal is directly proportional to the amplitude of the one of said first and third signals having the same frequency and is inversely proportional to that of the other of said signals.

2. A function generator element responsive to first, second and third signals which are subject to amplitude variations, said first signal having a first fixed frequency, said second and third signals having a second fixed frequency, said element comprising means to mix said second and third signals to derive therefrom a fourth signal of said second frequency proportional to an extreme value of said second and third signals; means to amplify said first and fourth signals with substantially the same gain; means to separate said amplified first and fourth signals from each other; means to derive an automatic gain control voltage from one of said amplified first and fourth signals; and means to apply said control voltage to said amplifying means to control the degree of amplification thereof in a direction at which the amplitude of the other amplified signal varies directly with that of the corresponding one of the unamplified first and fourth signals and varies inversely with that of the other amplified signal.

3. A function generator responsive to first and second amplitude modulated signals having first and second fixed frequencies, said generator including a generator element comprising an amplifier responsive to both signals to amplify same; a frequency separator coupled to the output of the amplifier and provided with a first output circuit tuned to said first frequency and a second output circuit tuned to said second frequency; an unidirectional negative feedback loop coupled between the first output circuit and the input of the amplifier to vary the amplifier gain in a direction at which the amplitude of the output signal appearing across said second output circuit is directly proportional to that of said second signal and inversely proportional to that of said first signal; a second like generator element provided with a second amplifier jointly responsive to the said output signal and to a third amplitude modulated signal having a third fixed frequency; a second frequency separator coupled to the output of the second amplifier and provided with a first output circuit tuned to said second frequency and a second output circuit tuned to said third frequency; and a second unidirectional feedback loop coupled between one of the output circuits of said second separator and the input of said second amplifier to control the gain of said second amplifier in a direction at which the amplitude of the second element output signal appearing across the other of the output circuits of said second separator is directly proportional to that of the one of the first element output signal and said third signal having the same frequency as said second element output signal and is inversely proportional to the amplitude of the other of said first element output signal and said third signal.

4. A function generator as set forth in claim 3 wherein said second loop is coupled between said second output circuit of the second separator and the input of said second amplifier and said one of said first element output signal and said third signal is said first output signal.

5. A function generator comprising first, second and third generator elements, each element including an amplifier, a frequency separator coupled to the output of said amplifier and provided with first and second output circuits each of which is tuned to a different frequency, and a unidirectional negative feedback loop coupled between the first output circuit of the separator and the input of the amplifier; means to apply first and second amplitude modulated signals having first and second fixed frequencies to the input of the amplifier of said first element, the first and second separator output circuits of said first element being respectively tuned to said first and second frequencies whereby the amplitude of the output signal appearing across the second separator output circuit of said first element is directly proportional to that of said second signal and is inversely proportional to that of said first signal; means to apply third and fourth amplitude modulated signals having third and fourth fixed frequencies to the input of the amplifier of said second element, the first and second separator output circuits of said second element being respectively tuned to said third and fourth frequencies whereby the amplitude of the output signal appearing across the second separator output circuit of said second element is directly proportional to that of said fourth signal and inversely proportional to that of said third signal; and means to apply the output signals from said first and second elements to the input of the amplifier of said third element, the first separator output circuit of said third element being tuned to one of said second and fourth frequencies, the second separator output circuit of said third element being tuned to the other of said second and fourth frequencies whereby the amplitude of the output signal appearing across the second separator circuit of said third element is directly proportional to that of the one of the output signals for the first and second elements whose frequency is equal to the tuned frequency of the second separator output circuit of said third element and is inversely proportional to that of the other of these output signals.

6. A function generator for deriving from eight separate incoming amplitude modulated signals an output signal whose amplitude is a predetermined function of all eight incoming signals, the first, second, seventh and eighth incoming signals having a first fixed frequency, the third, fourth, fifth and sixth incoming signals having a second fixed frequency; said generator comprising first, second and third generator elements, each element including an amplifier, a frequency separator coupled to the output of said amplifier and provided with first and second tuned output circuits respectively resonant to said first and second frequencies, and a unidirectional negative feedback loop coupled between the first tuned circuit and said amplifier to control the gain thereof; mixing apparatus responsive to all eight incoming signals to derive therefrom a first control voltage proportional to an extreme value of said first and second signals, a second control voltage proportional to an extreme value of said third and fourth signals, a third control voltage proportional to an extreme value of said fifth and sixth signals, and a fourth control voltage proportional to an extreme value of said seventh and eighth signals; means to supply said first and second control voltages to the amplifier of said first element, said first element yielding in its second tuned circuit a first computation signal having an amplitude directly proportional to that of said second control voltage and inversely proportional to that of said first control voltage; means to supply said third and fourth control voltages to the amplifier of said second element, said second element yielding in its second tuned circuit a second computation signal having an amplitude directly proportional to that of said fourth control voltage and inversely proportional to that of said third control voltage; and means to supply said first and second computation signals to the amplifier of said third element, said third element yielding in its second tuned circuit said output signal, the amplitude of said output signal being directly proportional to that of said second computational signal and inversely proportional to that of said first computational signal.

7. A function generator for deriving from first, second and third incoming amplitude modulated signals, an output signal which is a predetermined function of all of said incoming signals, said first and third signals having a first fixed frequency, said second signal having a second fixed frequency; said generator comprising first and second generator elements, each element comprising an amplifier, a frequency separator coupled to the output of the amplifier and provided with first and second tuned circuits respectively resonant to said first and second frequencies, and a unidirectional negative feedback loop coupled between the first tuned circuit and said amplifier; means to supply said first and second signals to the amplifier of said first element, said first element yielding in its second tuned circuit a computational signal whose amplitude is directly proportional to that of said second signal and inversely proportional to that of said first signal; and means to supply said computational signal and said third signal to the amplifier of said second element, said second element yielding in its second tuned circuit said output signal, the amplitude of said output signal being directly proportional to that of said third signal and inversely proportional to that of said computational signal.

8. A function generator element responsive to first, second, third and fourth signals which are subject to amplitude variations, said first and second signals having a first fixed frequency, said third and fourth signals having a second fixed frequency; said element comprising means to mix said first and second signals to derive therefrom a fifth signal of said first frequency proportional to an extreme value of said first and second signals, means to mix said third and fourth signals to derive therefrom a sixth signal of said second frequency proportional to an extreme value of said third and fourth signals; means to amplify said fifth and sixth signals with substantially the same gain; means to separate said amplified fifth and sixth signals from each other; means to derive an automatic gain control voltage from one of said amplified fifth and sixth signals; and means to apply said control voltage to said amplifying means to control the degree of amplification thereof in a direction at which the amplitude of the other amplified signal varies directly with that of the corresponding one of the amplified of the fifth and sixth signals and varies inversely with that of the other amplified signal.

References Cited in the file of this patent

UNITED STATES PATENTS

| | | |
|---|---|---|
| 2,065,826 | Roosenstein et al. | Dec. 29, 1936 |
| 2,454,415 | Tourshou | Nov. 23, 1948 |
| 2,471,262 | Cousins | May 24, 1949 |
| 2,477,028 | Wilkie | July 26, 1949 |
| 2,554,132 | Van Zelst | May 22, 1951 |